United States Patent [19]

Stanley

[11] 4,022,547
[45] May 10, 1977

[54] COMPOSITE BLADE EMPLOYING BIASED LAYUP

[75] Inventor: Max W. Stanley, Fairfield, Ohio

[73] Assignee: General Electric Company, Cincinnati, Ohio

[22] Filed: Oct. 2, 1975

[21] Appl. No.: 618,797

[52] U.S. Cl. .......................... 416/230; 416/241 A
[51] Int. Cl.² ................................................ F01D 5/14
[58] Field of Search ............. 416/230, 240, 241 A, 416/226

[56] References Cited

UNITED STATES PATENTS

| | | | |
|---|---|---|---|
| 3,237,697 | 3/1966 | Ford et al. | 416/226 |
| 3,528,753 | 9/1970 | Dutton et al. | 416/226 |
| 3,600,103 | 8/1971 | Gray et al. | 416/241 A X |
| 3,602,608 | 8/1971 | Morley | 416/226 X |
| 3,701,190 | 10/1972 | Stone | 29/156.8 |
| 3,713,753 | 1/1973 | Brunsch | 416/226 |
| 3,731,360 | 5/1973 | Stone | 29/156.8 B |
| 3,883,267 | 5/1975 | Baudier et al. | 416/230 |
| 3,886,647 | 6/1975 | Alexander | 228/175 |
| 3,942,231 | 3/1976 | Whitaker | 29/156.8 B |

FOREIGN PATENTS OR APPLICATIONS 1,328,167  8/1973  United Kingdom ............... 416/230

*Primary Examiner*—Everette A. Powell, Jr.
*Attorney, Agent, or Firm*—Robert C. Lampe, Jr.; Derek P. Lawrence

[57] ABSTRACT

A blade for use in a fluid flow machine such as a compressor or fan is fabricated by laying up and bonding together a plurality of filament laminates. The filaments of at least a portion of the laminates are skewed, in a chordwise direction, forward and aft of a non-radial blade axis, thus forming a biased layup with the blade center of twist biased forward or aft of the blade radial axis. This significantly increases the torsional frequency of the blade. In one embodiment, the filaments are skewed forward such that no filaments run from the blade leading edge to the blade tip but, rather, from the blade leading edge to the blade root. This orientation permits more strain produced by foreign object impact to be transmitted to the blade root where it can be more easily absorbed and dissipated by the blade supporting disc.

13 Claims, 7 Drawing Figures

U.S. Patent  May 10, 1977  4,022,547
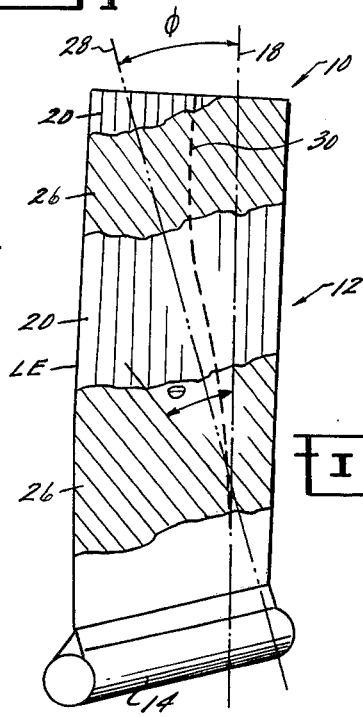
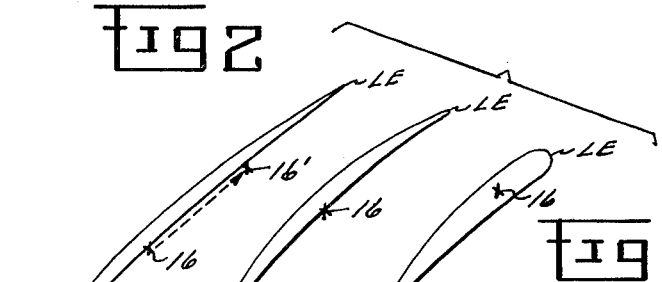
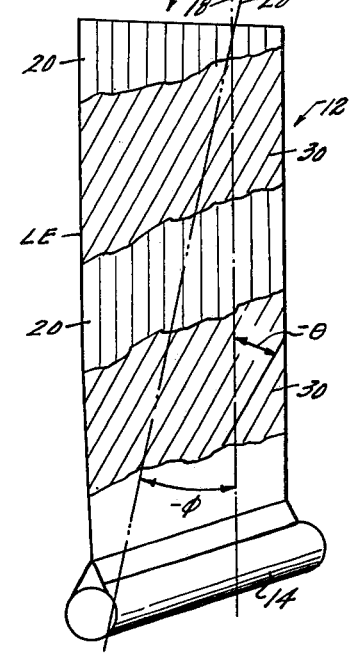
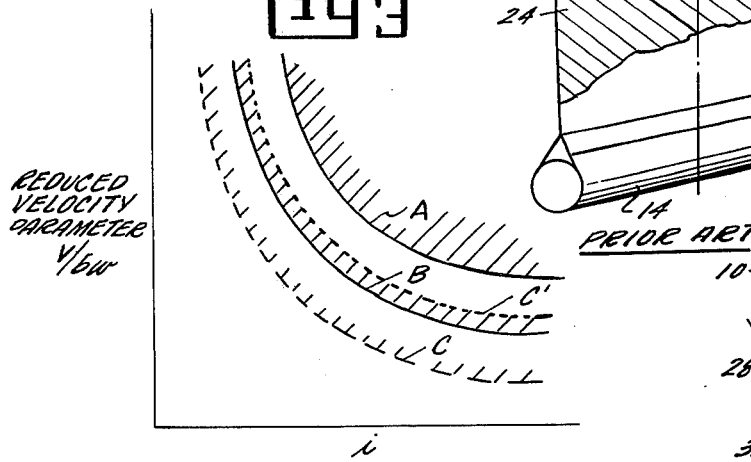
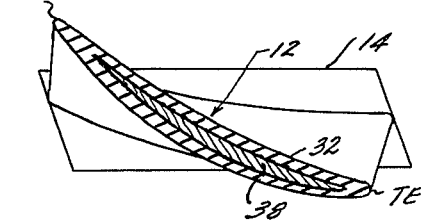
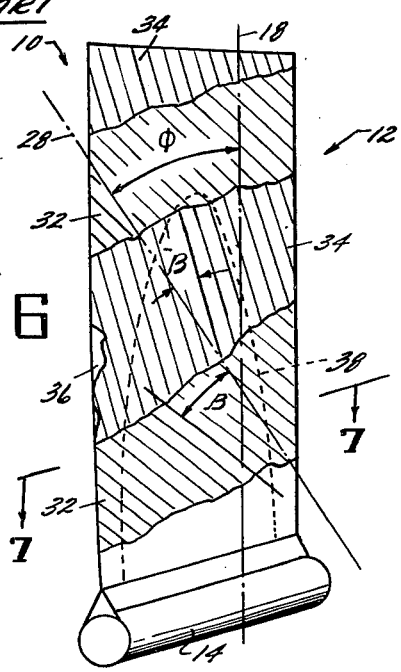

COMPOSITE BLADE EMPLOYING BIASED LAYUP

BACKGROUND OF THE INVENTION

This invention relates to composite blades for use in fluid flow machines and, more particularly, to increasing the torsional stability of such blades through selective orientation of the composite blade filament reinforced laminates.

The invention herein described was made in the course of or under a contract, or a subcontract thereunder, with the United States Department of the Air Force.

For many years attempts have been made to replace the relatively heavy, homogeneous metal blades and vanes of fluid flow machines such as gas turbine engine compressors with lighter composite materials. The primary effort in this direction has been toward the use of high strength, elongated filaments composited in a lightweight matrix. Early work involved glass fibers, and more recent efforts have been directed toward the utilization of boron, graphite and other synthetic filaments. These later materials have extremely high strength characteristics as well as high moduli of elasticity which contributes to the necessary stiffness of the compressor blades and vanes.

Many problems have confronted the efforts to utilize these filaments, particularly in adapting their unidirectional strength characteristics to a multidirectional stress field. To a large extent, these problems have been overcome and composite blades have been demonstrated with performance characteristics, in many areas, equal to or better than their homogeneous metal counterparts in addition to providing the expected and significant weight reductions.

However, several difficult design problems remain to be solved. In particular, composite blades generally exhibit a relatively low torsional frequency, implying the the torsional stability limit of the blades is relatively low. With such a low torsional stability limit the blade could conceivably be overstressed in torsion with subsequent torsional, vibration-induced, blade fatigue failure. As the blades for fluid-pumping machines have been designed to operate at increasingly higher speeds, such as experienced in gas turbine engine compressors and fans, the shape of the airfoil portion of the blade has migrated from a relatively thick, moderately cambered subsonic section to a relatively straight, low-cambered, supersonic section, thus tending to reduce the torsional stability limit even further.

One approach toward increasing the torsional stability of a composite blade involves the incorporation of a metallic core within the airfoil portion which serves as a torsional stiffener. Variations in material, size, shape, and disposition of the core will affect the torsional resonance of the blade. However, this approach has the disadvantages of having to bond the composite shell to the metallic core, the increased weight due to the metallic core, and the difficulty of controlling the precise disposition of the core within the composite matrix. Thus, a means of increasing blade torsional frequency is required which will not defeat the inherent advantage of the basic composite blade.

Another factor which has discouraged the introduction of composite blades into operational service on gas turbine engines is their vulnerability to what is referred to as foreign object damage (FOD). Many types of foreign objects may be entrained in the inlet of a gas turbine engine, ranging from large birds, such as seagulls, to hailstones, sand and rain. Damage from foreign objects takes two forms. Smaller objects can erode the blade material and degrade the performance of the compressor. Impact by larger objects may rupture or pierce the blades. Portions of an impacted blade can be torn loose and cause extensive secondary damage to the downstream blades and other engine components.

In this regard, the consequences of foreign object damage are greatest in the low pressure compressors, or fans, of high bypass gas turbine engines. However, these components offer the greatest potential in weight reduction due to their large tip diameters, as great as eight feet, and spans in the order of three or more feet.

The vulnerability of composite blades to foreign object damage is due to two factors. First, the lightweight matrix material employed, generally polymeric resins or metals such as aluminum, is relatively soft. Second, the high strength filaments are relatively hard and brittle. Furthermore, strain caused by the impact of a foreign object tends to travel along the filaments reinforcing the composite layers. In a cantilevered blade (for example, a blade cantilevered from the hub) the tip is unable to absorb such energy and, if the fibers communicate between the point of impact and the blade tip section, the fibers will transmit the strain to the tip section where, typically, the traveling strain waves will reinforce each other causing fracture of the blade at a location which might be substantially remote from the point of impact.

From this it became evident that a means was needed to protect the blade from FOD, thus precipitating the development of hard metallic leading edge protectors. A problem associated with such a leading edge protector is retaining it on the blade after impact due to blade bending and delamination. This, in turn, can result in secondary engine damage as the FOD protection strip is ingested through the machine or engine.

Thus, it becomes desirable to develop a blade for a high speed fluid flow machine such as a gas turbine engine compressor or fan which will transfer strain induced by foreign object impact into the hub of the blade where it can be absorbed through the blade supporting disc.

SUMMARY OF THE INVENTION

Accordingly, it is the primary object of the present invention to provide a filament composite blade for a fluid flow machine with increased torsional stability.

It is a further object of the present invention to provide a filament composite blade with reduced vulnerability to foreign object impact.

It is yet another object of the present invention to provide an improved method of fabricating a filament composite blade which will increase the blade torsional stability and decrease its vulnerability to foreign object impact.

These and other objects and advantages will be more clearly understood from the following detailed description, the drawings and specific examples, all of which are intended to be typical of rather than in any way limiting to the scope of the present invention.

Briefly stated, the above objectives are accomplished in a blade formed of elongated, small diameter filaments, having high strength and high modulus of elasticity, which are composited into a lightweight matrix which forms the primary composite structure of the blade. In one embodiment, the filaments of adjacent laminates are skewed, in a chordwise direction, forward and aft of a non-radial blade axis in an alternating relationship. This produces a layup of filament laminates, the center of twist of which is biased forward or aft of the blade radial, or longitudinal, axis. The degree of displacement of the center of twist is a design variable dependent upon blade operating environment and the degree of torsional stiffness required to remain within safe operational limits.

In another embodiment, the filaments are skewed forward such that no fibers run from the blade leading edge to the blade tip but, rather, they run from the leading edge to the blade root. This permits more of the strain produced by foreign object impact to be transmitted to the blade root where it can be more easily absorbed by the blade supporting disc.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a perspective view in partial cut-away of a composite gas turbine engine compressor blade embodying the present invention;

FIG. 2 depicts the evolution of gas turbine engine blade profile shapes as design rotational speed has increased;

FIG. 3 graphically depicts the torsional instability boundary for each of the blade profiles of FIG. 2;

FIG. 4 is a perspective view, similar to FIG. 1, of a prior art composite blade depicting the orientation of the filament laminates;

FIG. 5 is a perspective view, similar to FIG. 1, depicting an alternative embodiment of the present invention;

FIG. 6 is a perspective view, similar to FIG. 1, depicting another alternative embodiment of the present invention; and FIG. 7 is a cross-sectional view of the blade of FIG. 6 taken along line 7—7.

DESCRIPTION OF THE PREFERRED EMBODIMENT

Referring to the drawings wherein like numerals correspond to like elements throughout, attention is first directed to FIG. 1 wherein a composite blade 10 for use in a fluid flow machine and constructed according to the present invention is illustrated. While not so limiting, the blade 10 is adapted for use in axial flow gas turbine engine compressors and fans. It will become apparent to those skilled in the art that the present invention offers an improvement for many bladed structures and the rotor blade 10 is merely meant to be illustrative of one such application. Accordingly, rotor blade 10 is shown to comprise an airfoil portion 12, generally of radially variant camber and stagger, and a dovetail tang 14 which enables the blade to be mounted on and retained by a rotatable disc or hub in a conventional manner. A typical flow path defining platform, not shown, could be mounted between the airfoil 12 and the dovetail 14 portions of the blade.

The major portion, or primary structure, of the blade comprises laminates of elongated, small diameter filaments having high strength and high modulus of elasticity embedded in a lightweight matrix. In one embodiment involving predominantly non-metallic material, the airfoil portion 12 would comprise graphite filament laminates in an epoxy resin. However, it is understood that the present invention anticipates the use of any fiber embedded in any binder, such as an organic resin, for its structure. Further, it is anticipated that the structure could comprise any metallic system, including boron filaments in an aluminum matrix.

Referring now to FIG. 2, there is depicted therein, by way of example, the evolution of gas turbine engine rotor blade profile shapes as the design rotational speed requirements have increased. In particular, in order of increasing rotational velocity, FIGS. 2A, 2B and 2C represent profiles of typical 65-series, double-circular arc and arbitrary supersonic airfoil section profiles, respectively, with the blade section leading edges (LE) and trailing edges (TE) oriented as indicated. It becomes readily apparent that the evolution of the blades has resulted in generally thinner profiles with the bulk of the blade mass shifted toward the trailing edge. This, in turn, has caused the blade center of twist 16 (about which torsional vibration occurs) to shift aft on the blade.

What this evolutionary process has meant to the torsional stability of the blade, everything else being equal, is represented by FIG. 3 in which the reduced velocity parameter ($V/b\omega$, where $V$ = velocity of fluid with respect to blade $b$ = ½ blade chord, and, $\omega$ = first torsional frequency of blade)

is plotted as a function of incidence angle, $i$, for each of the airfoil sections of FIG. 2, with the alphabetic identifications of FIG. 2 being consistent with those of FIG. 3. In essence, the cross-hatched area of FIG. 3 bounded by curve A represents the torsional instability region for a typical 65-series airfoil, and any excursion into this region would be expected to induce an aeromechanical failure of the blade in torsion. Similarly, curves B and C represent the boundaries for the double-circular arc and supersonic airfoils, respectively. It becomes apparent that the available operating range has been continuously encroached upon by the instability boundary during the blade evolutionary process, thus becoming a limiting consideration constraining blade design. Accordingly, it is one objective of the present invention to increase the stable operating region of FIG. 3 for the blades of FIG. 2 and, particularly, for those of the supersonic variety of FIG. 2C.

Referring now to FIG. 4, there is illustrated therein a composite rotor blade, somewhat similar to FIG. 1, but constructed according to the prior art. Therein, filament laminates embedded in a matrix are laid and bonded together in essentially parallel relationship to each other to form the airfoil portion 12 of blade 10. In particular, the laminates are arranged such that the filaments are disposed at predetermined angles and balanced with respect to the radial axis or stacking axis 18 of the blade, depending upon airfoil configuration. As illustrated in FIG. 4, laminates 20 are oriented with the filaments in the essentially radial direction as indicated by the cross-hatching therein. The filament angles may vary through the blade thickness, with laminates 22 including filaments skewed aft at an angle $-\theta$ from radial axis 18 and laminates 24 including filaments skewed forward at an angle $+\theta$ from radial axis 18. However, the skewing of the laminates in the chordwise direction has heretofore been symmetrical (or balanced) about the essentially radial axis 18 such as a typical layup of [0°/20°/0°/−20°], the tendency being toward the creation of a pseudoisotropic airfoil section. The center of twist of such a blade characteristically behaves as in FIGS. 2 and 3, depending upon airfoil profile shape. Since the locus of the points representing the center of twist of each airfoil section in the radial direction is essentially a radial line, it becomes convenient to consider it coincident with radial axis 18.

In an effort to shift the center of twist of the blade forward and thus increase the torsional stability of the blade, the present invention contemplates skewing the layup axis of symmetry forward such that the resultant filament orientation of the laminates is other than radial. Referring again to FIG. 1, the filaments of laminates 20 are essentially radial ($\theta = 0°$) whereas the filaments of laminates 26 are essentially at an angle ($\theta = 20°$) with the radial axis. This forms a bias layup represented as [0°/20°/0°/20°] with the line of symmetry 28 of the filaments being at an angle $\phi$ (here approximately equal to 10°) forward with respect to the radial axis 18. Any other layup can be applied and varied through the blade thickness, the selected layup being dependent upon the desired frequency tuning or strain distribution. Furthermore, the layup does not have to comprise alternating laminates with only two filament orientation angles. The inventive concept described herein encompasses any unbalanced layup wherein the axis of symmetry is skewed from the radial direction. The essence of biasing the filaments in the forward direction (for example) is that the locus of the center of twist is moved forward as depicted by dotted line 30 in FIG. 1. When the center of twist of a supersonic blade (like that of FIG. 2C) is moved forward, the torsional stability limit of the blade is increased. Relating this to FIGS. 2C and 3, the center of twist moves to position 16' and the torsional boundary to that depicted by curve C'.

FIG. 5 depicts an embodiment wherein the center of symmetry 28 of the filaments is biased at an angle $-\phi$ aft of the radial axis 18, thus moving the center of twist aft. Again, laminates 20 are oriented essentially radially while laminates 30 are oriented with their filaments at an angle $-\theta$ with the radial axis. This configuration may benefit certain selected airfoil profile shapes in particular aerodynamic environments and is meant to show that the concept of biasing the filament plies works equally well in shifting the center of twist forward or aft.

FIG. 6 depicts an embodiment wherein none of the filaments are oriented radially. The filaments of laminates 32 are biased forward at an angle $\beta$ with respect to the axis of symmetry 28 while laminates 34 are biased aft at an angle $-\beta$ with respect to the axis of symmetry. The axis of symmetry is further biased forward at an angle $\phi$ with respect to the radial axis such that ($\phi + \beta$) is greater than zero and ($\phi - \beta$) is greater than zero.

A significant feature of the embodiments of FIGS. 1 and 6 is that they improve the tolerance of the blade to foreign object impact. Consider the blade of FIG. 6 having been impacted by a foreign object such that damage results at location 36 on the leading edge. By skewing the filaments forward, no filaments run from the blade leading edge to the tip. All filaments run from the leading edge toward the root, or dovetail tang 14. Because the impact-generated strain tends to flow through the filaments, the forward biased layup will transmit more impact strain to the blade root where it can be absorbed and dissipated by the disc or hub (not shown) supporting the dovetail tangs 14. Since the tip of the blade is unable to absorb this strain, the present configuration results in a stronger, more impact-tolerant blade. While not all of the filaments need run from the leading edge to the root, as the percentage increases, so will the blade's tolerance to foreign object impact increase.

Further, the bias layup provides greater design latitude in controlling the strain distribution (both steady-state and vibratory) in the blade. For instance, the [0°/20°/0°/20°] layup of FIG. 1 will transmit strain from the very critical, thin leading edge of the blade of FIG. 2C chordwise aft to the thicker, less critical portion of the blade.

The present invention may also be employed in conjunction with a metallic insert 38 disposed as a core within the airfoil portion 12 (FIGS. 6 and 7). Shifting of the core forward or aft will alter the torsional response of the blade and supplement the effect of filament biasing, as previously discussed.

It will be obvious to one skilled in the art that certain changes can be made to the above-described invention without departing from the broad inventive concepts thereof. For example, the invention is applicable to all blades for use in fluid flow machinery including helicopter blades and propellers. It is equally adaptable to gas turbine engine fans, rotor blades, stators, turbine vanes and turbine buckets. It is intended that the appended claims cover these and all other variations in the present invention's broader inventive concepts.

Having thus described the invention, what is considered novel and desired to be secured by Letters Patent of the United States is:

1. A blade for use in a fluid flow machine comprising a plurality of filament laminates bonded together to form the blade, said filament laminates having an axis of symmetry which is skewed from the blade longitudinal axis.

2. The blade of claim 1 wherein said axis of symmetry is skewed forward relative to the blade longitudinal axis.

3. The blade of claim 1 wherein said axis of symmetry is skewed aft relative to the blade longitudinal axis.

4. The blade of claim 1 wherein a first portion of the laminates are oriented with their filaments substantially along the blade longitudinal axis.

5. The blade of claim 1 wherein a first portion of the laminates are oriented with their filaments skewed forward at a first angle to the blade longitudinal axis and a second portion of the laminates are oriented with their filaments skewed forward at a second angle to the blade longitudinal axis, said laminates of the first portion and said laminates of the second portion being bonded together in an alternating relationship.

6. The blade of claim 1 having a leading edge and a tip, and wherein no filaments extend from the blade leading edge to the tip.

7. The blade of claim 1 further comprising a metallic core disposed between two adjacent filament laminates to increase the torsional stability of the blade.

8. A blade having a center of twist for use in a fluid flow machine and comprising a plurality of filament laminates bonded together to form the blade, at least a portion of said filament laminates being skewed in the chordwise direction such that the center of twist is other than along a longitudinal axis of the blade.

9. The blade of claim 8 wherein said laminates are skewed in the chordwise direction, in an alternating relationship, forward and aft of an axis of symmetry and wherein the axis of symmetry is not a longitudinal axis of the blade.

10. The blade of claim 9 wherein said axis of symmetry is skewed forward relative to the blade longitudinal axis.

11. The blade of claim 8 wherein the blade center of twist is shifted forward, in a chordwise direction, relative to the blade longitudinal axis.

12. A blade for use in a fluid flow machine and comprising a plurality of filament laminates bonded together to form the blade, the filaments of adjacent laminates being skewed in the chordwise direction relative to each other, forward and aft, of a non-radial axis of symmetry thereby increasing the torsional stability of the blade.

13. In a method of fabricating a blade for use in a fluid flow machine, the blade comprising a plurality of filament laminates bonded together to form the blade, the step of orienting the filament laminates to create an axis of symmetry which is skewed from the blade longitudinal axis.

* * * * *